W. Vogelbusch
INVENTOR

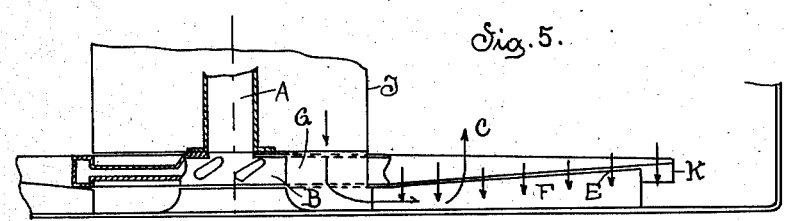
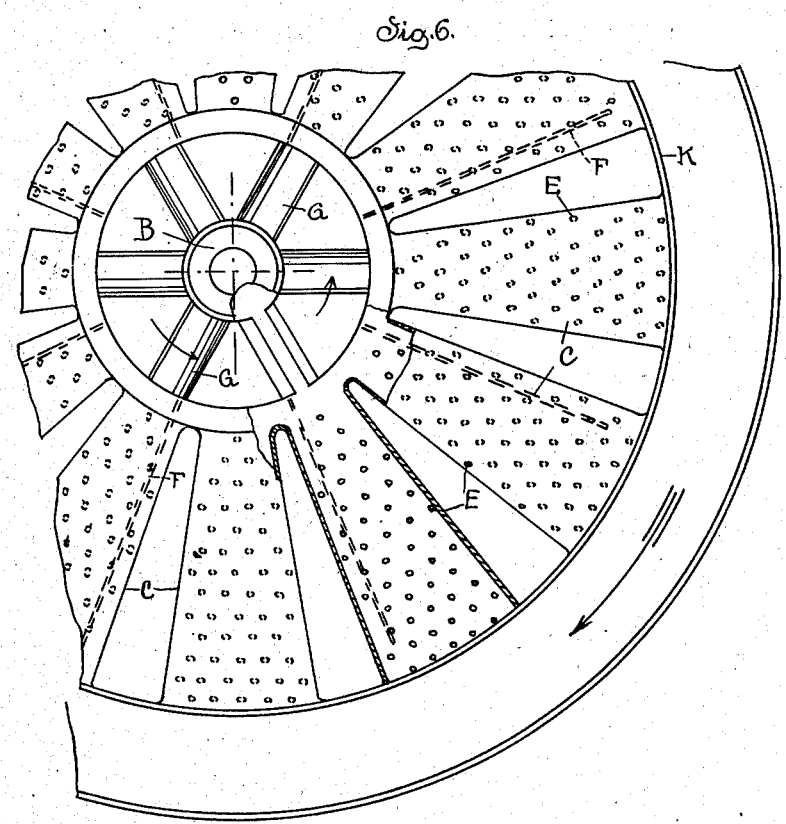

June 21, 1938. W. VOGELBUSCH 2,121,458
APPARATUS AND PROCESS FOR AERATING WORT IN YEAST PRODUCTION
Filed Dec. 5, 1933 3 Sheets-Sheet 3
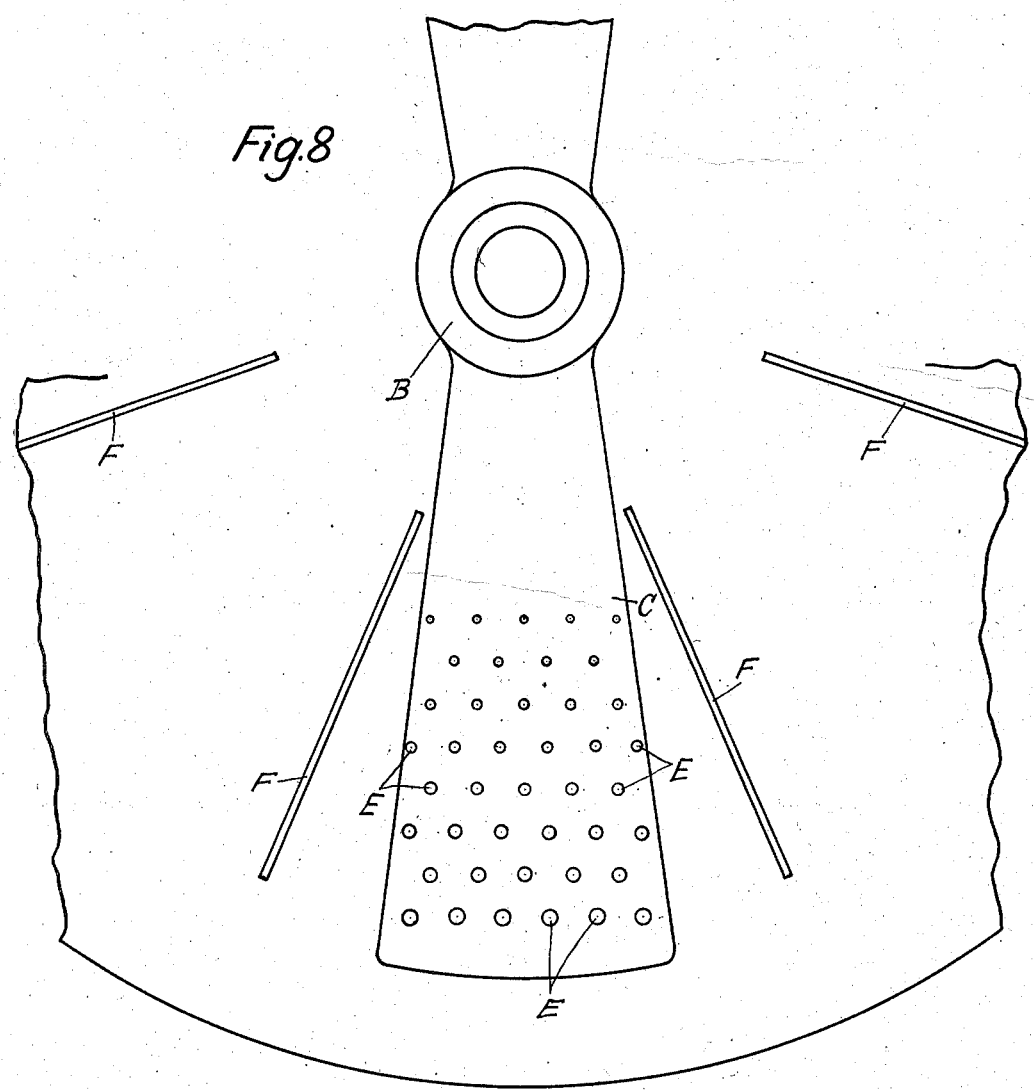
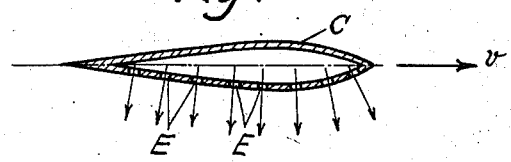

Patented June 21, 1938

2,121,458

UNITED STATES PATENT OFFICE 2,121,458

APPARATUS AND PROCESS FOR AERATING WORT IN YEAST PRODUCTION

Wilhelm Vogelbusch, Vienna, Austria

Application December 5, 1933, Serial No. 701,083
In Austria December 9, 1932

29 Claims. (Cl. 195—95)

In the production of yeast, air is supplied to the wort during the fermentation in order to meet the oxygen requirements of the multiplying cells and also to render harmless the interchange products which are produced. Hitherto, compressed air from an air pump has usually been introduced into the wort through a rigidly mounted tube system which is placed horizontally at the bottom of the fermenting vat and the separate tubes of which are provided with holes. The attempts in recent years to reduce the size of the air bubbles have led to the diameter of the air outlet holes being reduced down to 0.3 mm. On account of the danger of stoppage and the difficulty of keeping clean with such a diminution, it is not desirable to go below this diameter with bore holes, quite apart from the fact that the manufacture of smaller borings would be very expensive.

A diminution of the amount of air can be obtained if the air is forced into the wort through the fine bores of a ceramic mass instead of through such holes. Distributing devices provided with tubes or boxes of burnt clay, stoneware, sintered glass, etc. to act as air outlet surfaces have been used. The saving in power, however, does not correspond to the reduction of the amount of air as these materials, on account of their smaller permeability, require a higher operating pressure. In addition, it is difficult to keep such a body perfectly clean as is required for avoiding contamination.

The object of the invention is to avoid these disadvantages and the invention consists in that a hollow body of suitable shape serving for delivering the air into the liquid through comparatively large openings and which, in the direction of movement, offers as little resistance as possible and allows the air to escape preferably in a direction different from the direction of movement and preferably at right angles or approximately at right angles thereto is moved through the surrounding liquid with a large velocity relative thereto so that the comparatively large bubbles of air escaping from the openings, arranged preferably at the lower side of the air supply member, are broken up at the moment of contact with the liquid into extremely fine bubbles. This effect is obtained to a very great degree with an aerating device having comparatively large openings of, for example, 2 mm. diameter. Such a very fine practical emulsion distribution of the air could hitherto only be obtained in the yeast industry by using the above-mentioned ceramic materials for the air supply member which, on account of the above-mentioned disadvantages, have not become widely used.

It is known to distribute air or steam in a liquid by means of tubes arranged rotatably about a vertical axle. The device according to the invention differs fundamentally from this known arrangement in that for the distribution of the air an air supply member is used which is of a shape suited to the uniform distribution of the air over the cross-section of the vessel and has a cross-section which offers least resistance to the surrounding liquid in the direction of movement, the outlet openings being preferably so arranged that the escape of air occurs in a direction different from the direction of movement preferably substantially at right angles to the direction of movement of the distributing member.

The relative velocity of the new aerating member can, by means of guiding blades for the surrounding liquid, be raised practically up to the peripheral speed. By this means at the place where the air passes into the liquid on account of the form chosen for the aerating member, there is also a suction effect under influence of which the air pressure necessary when the aerating member is stationary for overcoming the static liquid pressure on the resistance to movement arising when the air passes through the openings is substantially diminished.

In order to avoid the formation of larger air bubbles according to the invention the air outlet openings are provided only at parts of greater distance from the pivotal axis, that is, at the parts of the aerating member at which the necessary speed with respect to the surrounding liquid is obtained.

It is of advantage to construct the aerating member in such a manner that it has a small resistance to movement through the surrounding liquid in the direction of movement. In order to obtain this result, the separate arms or vanes are made, for example, drop shape or with the cross-section of a two-edged sword with the base becoming broader towards the wall of the vessel.

By means of an aerating device according to the invention the air can be sucked directly from the atmosphere if the speed of revolution is increased above that necessary for the atomization to such an extent that at the air outlet openings a sufficient dynamic pressure or a corresponding suction effect is obtained. Since by the increase in the speed of revolution the resistance to the air liquid mixture rising from the lower side of the aerating member (through the latter) increases, it is advisable to provide a device, for example, a screw or blade wheel for bringing the liquid to be aerated up to the aerating member.

A constructional form of the aerating member which is suitable for this purpose consists, for example, of a hollow blade of suitable cross-section surrounding the hollow supply shaft and having several arms and being in the form of a screw, a hollow annular space surrounding the blade and the actual air distributing member mounted on the latter. The inner part of the rotating member sucks in the liquid near to the axle and forces it under the aerating member from which it is directed radially outwards, in a vertical direction being guided by the bottom of the vessel and the lower surface of the aerating member and in the horizontal direction being guided by guiding plates. In this way it is intimately mixed with the air coming through the aerating member after which the air liquid mixture flows upwards through the space between the separate arms of the aerating member.

In order to prevent parts of this liquid escaping in a radial direction over the outer periphery of the aerating member before having taken up a sufficient amount of air, it is advisable to surround the aerating member with a ring directed downwardly, that is towards the bottom of the vessel, which then acts like a hydraulic seal.

By the provision of a cylinder arranged coaxially with the axis of rotation, the distance between the suction zone and the aerating member can be increased and the result thereby obtained that only such liquid is drawn in as in passing through the container has already partly or wholly given up the air. The guiding cylinder may be made telescopic in order to be able to vary the position of the suction surface as required, corresponding to the level of liquid in the vessel to be aerated.

In the accompanying drawings the invention is illustrated in constructional examples.

Figure 3:
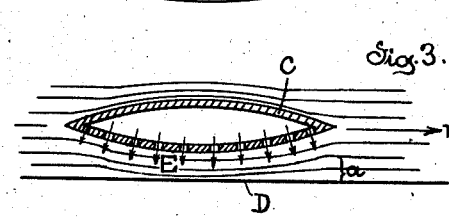
Figure 4:
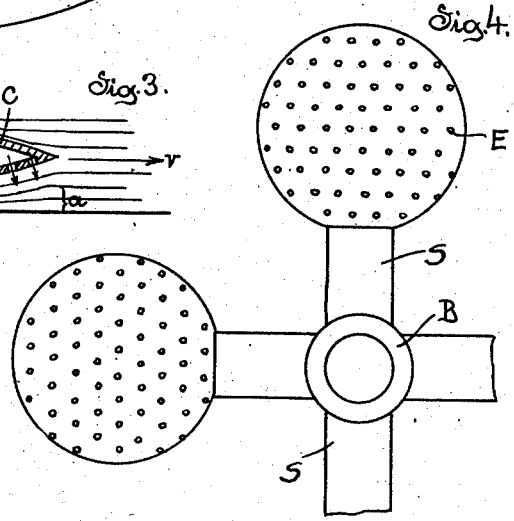

Fig. 3 is a vertical section through a blade of the air distributing member with stream lines indicated for making clear the action of the distribution, Fig. 4 shows a plan view of a modification of the aerating member, Figs. 5 and 6 show diagrammatically in elevation and plan a constructional form of the aerating member which sucks in air itself, while Fig. 7 is a vertical section through a blade having drop shape.

The suitably mounted mechanically driven hollow shaft A carries at its lower end the aerating member which in cross-section (Fig. 7) is made, for example, drop shaped and which consists of a hollow middle piece B with hollow agitating blades C. The latter have at their outer part outlet openings E for the air directed preferably to the bottom D of the vat. The air escaping from the openings of the blades C which are moving with suitable speed through the surrounding liquid is atomized by the liquid flowing past the blades, each separate jet of air coming out of an opening E being cut off directly at the wall of the blade at right angles to its middle axis an infinite number of times.

In order to keep the surface of the aerating member which is necessary for the provision of the outlet openings and consequently the power required for the device as small as possible, the cross-section of the openings may be made greater gradually or in steps according to their distance from the axis since with increasing speed the atomization of correspondingly coarser jets of air becomes possible. As the air outlet openings must lie at a certain distance apart, it is advisable to enlarge the separate arms of the aerating member as the distance from the shaft increases in order that at each point the air outlet cross-section corresponding to the surface to be aerated may be provided, for which purpose, for example, the shape of a circular sector is of advantage.

As a modification the separate wings or blades of the aerating member may consist of hollow arms S, as shown in Fig. 4, which arms carry at their outer ends circular or rectangular hollow bodies.

Figure 1:
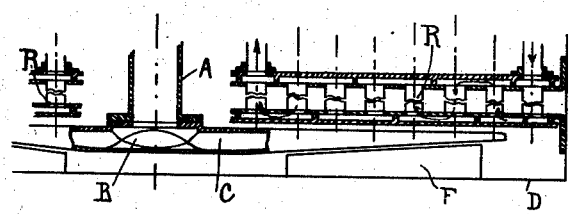
Fig. 1 shows a vertical section through the aerating member.
Figure 2:
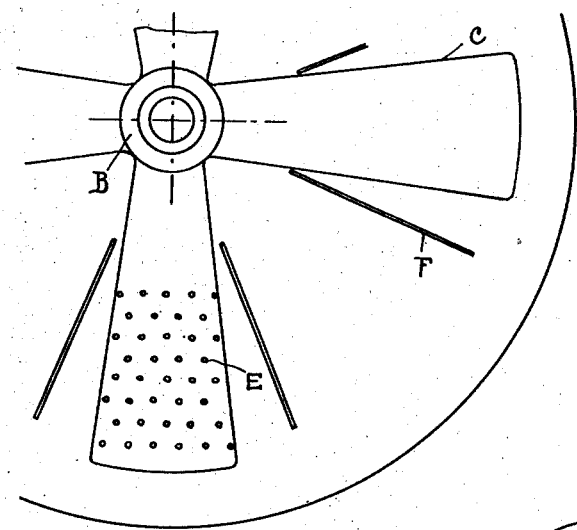
Fig. 2 is a plan view of the same partly in section.

The cross-section of the aerating bodies, no matter whether they show a form in plan view as in Fig. 2 or 4 or 6 or any other suitable form, is chosen in view of decreasing as much as possible the resistance against movement.

The liquid which is preferably guided downwardly in the neighborhood of the shaft B and then outwardly by the bottom D of the vat may be guided by suitable baffle plates F, preferably arranged below the rotating aerating member and thereby prevented from rotating. This also assists the atomization because the air and wort mixture which is directed downwardly is again broken up between the bottom of the vat and the blades at the points a at which the liquid is in movement in spite of the baffle plates.

In order to assist the action of the baffle plates F, the device necessary for cooling the wort may be constructed as a tube system R with a tube axis which is vertical or horizontal. It is preferable to arrange from 2–4 cooling elements placed diametrically opposite to one another and brought as near as possible to the blades C.

Especially in large fermenting vats it may be of advantage to conduct the wort in a positive manner past the aerating member C in order to obtain uniform aeration of the whole wort. In this case the part G lying near to the driving shaft A is made in the form of screw blades, as shown diagrammatically in Figs. 5 and 6 and then serves as a deflecting means for the wort. A ring K prevents any part of the wort delivered by the blades G from escaping outwardly directly since the lower edge of the ring K forms a kind of hydraulic seal.

The cylinder J which may be made extensible upwards telescopically ensures that the liquid which is to be fed to the aerating member C by means of the propeller G will be withdrawn at the proper parts of the fermenting vat.

What I claim is:

1. In the production of yeast, the process of aerating the wort which consists in directing a multitude of air jets into the wort so as to decompose each jet into air bubbles formed in the wort at the entrance of the jet and subdividing said bubbles during their formation.

2. In the production of yeast, the process of aerating the wort which consists in directing a multitude of air jets into the wort so as to decompose each jet into air bubbles formed in the wort at the entrance of the jet and detaching said bubbles from the jet while they are growing.

3. In the production of yeast, the process of aerating the wort which consists in directing a multitude of air jets into the wort so as to form of each jet air bubbles in the wort at the entrance of the jet and subjecting said bubbles while growing out of the jet to a shearing action sufficient to detach bubbles from the jet before they have reached their grown-out size.

4. In the production of yeast, the process of aerating the wort which consists in directing a multitude of air jets into the wort so as to form of each jet air bubbles in the wort at the entrance of the jet and thereat moving the wort relatively to the jet in a direction different from the direction of the jet with sufficient speed for detaching bubbles from the jet before they have reached their grown-out size.

5. In the production of yeast, the process of aerating the wort which consists in directing a multitude of air jets into the wort so as to form of each jet large-sized air bubbles in the wort at the entrance of the wort and subdividing said bubbles during their formation so finely as to obtain an air-and-wort mixture having the aspect of an emulsion.

6. In the production of yeast, the process of aerating the wort which consists in directing into the wort a multitude of air jets capable of forming at their entrance in the wort large-sized air bubbles and subjecting said bubbles while they are growing out of the jets, to a shearing action adapted to detach the bubbles from the jets when the bubbles are still sufficiently small for producing with the wort and air-and-wort mixture having the aspect of an emulsion, said shearing action being obtained by moving the wort in relation to the jets and in a direction different from the direction of the jet with a proper speed.

7. In yeast production, a device for aerating the wort, comprising a fermenting vat adapted to contain the wort during the fermentation process, a wing-shaped hollow aerating body arranged within said vat for dipping in the wort and adapted to receive air and to deliver the same into the wort, said aerating body having a multitude of small air outlet apertures sufficiently large to permit the passage of the air therethrough as well as the passage of the wort, and mechanical means for moving said aerating body relatively to said vat so as to pass the wort along the said apertures of the body with sufficient velocity for detaching from the apertures the air bubbles formed in the wort by the air escaping from the apertures, before these bubbles have reached their grown-out size.

8. In yeast production, a device for aerating the wort, comprising a fermenting vat adapted to contain the wort during the fermentation process, a hollow aerating body arranged for relative rotation to said vat and having in the vicinity of the bottom of the vat substantially horizontal radial hollow arms provided, on radial surfaces, with a multitude of small air outlet apertures which are sufficiently large to permit the passage of air as well as the passage of wort therethrough, said aerating body being adapted to receive air and to deliver the same through the said apertures into the wort, and mechanical means for producing a relative rotation of sufficient velocity between the vat and the aerating body to detach from the outlet apertures the air bubbles formed there in the wort by the escaping air, before these bubbles have reached their grown-out size.

9. In yeast production, a device for aerating the wort, comprising a fermenting vat adapted to contain the wort during the fermentation process, a wing-shaped hollow aerating body arranged within said vat for being moved relatively thereto while dipping in the wort and shaped in the manner known for reducing the resistance of a liquid to the motion of a body therein and adapted to receive air and provided with a multitude of outlet apertures serving to deliver the air into the wort and having a range of size of a few millimeters, and mechanical means for moving said aerating body relatively to said vat with sufficient velocity for having the air bubbles detached from the said apertures by the shearing action of the wort, while being formed in the wort at the entrance of the air, and before said bubbles have reached their grown-out size.

10. In yeast production, a device for aerating the wort, comprising a fermenting vat adapted to contain the wort during the fermentation process, a hollow aerating body arranged for relative rotation to said vat and substantially horizontal radial hollow arms in the vicinity of the bottom of the vat, said arms being provided on their lower radial surfaces with a multitude of air outlet apertures having a mean diameter of at least two millimeters, said aerating body being adapted to receive air and to deliver the same through the said apertures into the wort, and mechanical means for producing a relative rotation between the vat and the aerating member, of sufficient velocity for atomizing the air bubbles formed in the wort by the air escaping from the said apertures.

11. In yeast production, a device for aerating the wort, comprising a fermenting vat adapted to contain the wort during the fermentation process, a hollow aerating body arranged for relative rotation to said vat about a substantially vertical axis and in the vicinity of the bottom of the vat substantially horizontal radial hollow arms shaped in the manner generally called "stream-line-shaped" and provided on their lower radial surfaces, with a multitude of air outlet apertures having a mean diameter of at least two millimeters, said aerating body being adapted to receive air and to deliver the same through the said apertures into the wort, mechanical means for producing a relative rotation between the vat and the aerating member so as to atomize the air bubbles issuing from the said apertures into the wort, and baffle members placed at the bottom of the vat below the said hollow arms and adapted to obviate a material decrease of the relative velocity between the aerating body and the wort.

12. In yeast production, a device for aerating the wort, comprising a fermenting vat adapted to contain the wort during the fermentation process, a wing-shaped hollow aerating body arranged within said vat for being rotated relatively thereto while dipping in the wort and adapted to receive air and provided with a multitude of small outlet apertures serving to deliver the air into the wort and being sufficiently large for permitting the passage of air through the apertures as well as the passage of wort, and mechanical means for rotating said aerating body relatively to said vat with sufficient velocity for having the air bubbles, while issuing from the apertures, atomized by the shearing action of the wort, the size of the said apertures increasing in the direction from the axis of rotation towards the periphery of the aerating body so as to obtain throughout the wort air bubbles of uniform size.

13. In yeast production, a device for aerating the wort, comprising a fermenting vat adapted to contain the wort during the fermentation process, a hollow aerating body arranged for relative rotation to the vat and having in the vicinity of the bottom of the vat substantially horizontal radial hollow arms shaped in the manner which is generally called "stream-line-shaped" and provided, but only on the outer portion of their lower radial surfaces, with a multitude of air outlet apertures having a mean diameter of at least two millimeters, said aerating body being adapted to receive air and to deliver the same through the said apertures into the wort, and mechanical means for producing a relative rotation between the vat and the aerating member so as to atomize the air bubbles while issuing from the said apertures into the wort.

14. In yeast production, a device for aerating the wort, comprising a fermenting vat adapted to contain the wort during the fermentation process, a hollow aerating body arranged for relative rotation to said vat and having in the vicinity of the bottom of the vat substantially horizontal radial hollow arms provided on their lower radial surfaces with a multitude of small air outlet apertures which are sufficiently large for permitting the passage of air therethrough as well as the passage of wort, said aerating body being adapted to receive air and to deliver the same through said apertures into the wort, mechanical means for producing a relative rotation of sufficient speed between the vat and the aerating body so as to detach from the said outlet apertures the air bubbles issuing therefrom into the wort, before these bubbles have reached their grown-out size, and propelling means whereby the wort to be aerated is forced to descend adjacent to the axis of rotation towards the bottom of the vat and to flow from there into the space provided between said bottom and the lower surfaces of the said hollow arms.

15. A device for aerating the wort, as claimed in claim 14, wherein the said hollow arms of the aerating body are so constructed and arranged in relation to the bottom of the said vat as to have the distance between said bottom and the lower surface of each hollow arm increasing towards the outer periphery of said arm.

16. In yeast production, a device for aerating the wort, comprising a fermenting vat adapted to contain the wort during the fermentation process, a hollow aerating body rotatably mounted within said vat and having in the vicinity of the bottom of the vat substantially horizontal radial hollow arms which are provided on their lower radial surfaces with a multitude of small air outlet apertures, said aerating body being adapted to receive air and to deliver the same through the said apertures into the wort, the portion of said body adjacent to the axis of rotation being constructed in such a manner that it is adapted when being rotated to force the wort to be aerated into the space provided between the bottom of the vat and the lower surfaces of the said hollow arms, and mechanical means for rotating said aerating body with sufficient velocity for atomizing the bubbles while issuing from the said aperture into the wort.

17. In yeast production, a device for aerating the wort, comprising a fermenting vat adapted to contain the wort during the fermentation process, a hollow aerating body arranged for relative rotation to said vat and having in the vicinity of the bottom of the vat substantially horizontal radial hollow arms which are provided on their lower radial surfaces with a multitude of air outlet apertures and on their outer periphery with a ring adapted to prevent escape of liquid over the periphery of the aerating body towards the vertical wall of the vat, said aerating body being adapted to receive air and to deliver the same through the said apertures into the wort, and mechanical means for producing a relative rotation of sufficient velocity between the vat and the aerating body for atomizing the air bubbles while issuing from the said outlet apertures into the wort.

18. In yeast production, a device for aerating the wort, comprising a fermenting vat adapted to contain the wort during the fermentation process, a hollow aerating body arranged for relative rotation to said vat in the clockwise as well as in the counterclockwise direction and having radial hollow arms shaped in the manner known in the art for reducing the resistance of a liquid to both the clockwise and the counterclockwise rotations of a body submerged, said hollow arms being adapted to receive air and being provided on their lower radial surfaces with a multitude of apertures for delivering the air into the wort, and mechanical means for producing a relative rotation of sufficient velocity between said aerating body and the said vat for detaching from the said outlet apertures the air bubbles formed there in the wort by the escaping air, before said bubbles have reached their grown-out size.

19. In yeast production, a device for aerating the wort comprising a fermenting vat adapted to contain the wort during the fermentation process, a wing-shaped hollow aerating body arranged within said vat for rotation and being so constructed as to receive air and, on being rotated with sufficient speed, to deliver the air into the wort against the hydraulic pressure of the wort, by the dynamic suction effect alone, said aerating body being provided with a multitude of small apertures facing the bottom of the vat, said apertures being sufficiently large for permitting the passage of air as well as the passage of wort therethrough, and mechanical means for rotating said aerating body with sufficient velocity for atomizing the air bubbles while issuing from the said apertures into the wort.

20. In a device for aerating the wort, as claimed in claim 8, means for circulating the wort past the perforated radial surfaces of the said hollow arms, in a radial direction.

21. In a device for aerating the wort, as claimed in claim 7, baffle means arranged for preventing a material decrease of the relative velocity between the said aerating body and the wort.

22. In a device for aerating the wort, as claimed in claim 8, baffle means arranged in the vicinity of the said air outlet apertures and adapted to prevent a material decrease of the velocity with which the wort is passing along the said apertures.

23. In a device for aerating the wort, as claimed in claim 10, spaced upright baffle plates arranged in the space between the bottom of the said vat and the lower radial surfaces of the said hollow arms of the aerating body, said baffle plates being adapted to prevent a material decrease of the relative velocity between the said aerating body and the wort.

24. In the process of propagating yeast, the improvement which comprises introducing air into a liquid yeast nutrient medium containing yeast undergoing propagation, in the form of large bubbles, and greatly reducing the size of said bubbles in the nutrient medium by centrifuging said large bubbles with said nutrient medium.

25. The process as set forth in the preceding claim, in which the air is introduced at near the bottom of the nutrient medium and is under a pressure not substantially in excess of the hydrostatic pressure of the nutrient medium at the point of air entry.

26. In the process of propagating yeast, the improvement which comprises introducing air bubbles into a liquid yeast nutrient medium containing yeast undergoing propagation, greatly reducing the size of the air bubbles within the liquid, said reduction in size of the air bubbles being effected by subjecting them to a shearing action within the liquid.

27. The process of propagating yeast as set forth in the preceding claim in which the air is introduced at near the bottom of the nutrient medium and is under a pressure not substantially in excess of the hydrostatic pressure of the nutrient medium at the point of air entry.

28. In the process of propagating yeast, the improvement which comprises introducing air bubbles into a liquid yeast nutrient medium containing yeast undergoing propagation, greatly reducing the size of the air bubbles within the liquid, said reduction in size of the air bubbles being effected by introducing them into the liquid in such manner as to impart to them a rotary motion relative to said liquid.

29. In the process of propagating yeast, the improvement which comprises introducing streams of air bubbles into a liquid yeast nutrient medium containing yeast undergoing propagation, and greatly reducing the size of individual air bubbles of said streams of air bubbles within the liquid, said reduction of the size of individual air bubbles being effected by motion imparted to the liquid yeast nutrient medium contiguous to said streams of air bubbles, in a direction different from that of said streams of air bubbles.

WILHELM VOGELBUSCH.